United States Patent
Gellrich et al.

(10) Patent No.: US 12,053,348 B2
(45) Date of Patent: Aug. 6, 2024

(54) IMPLANT COMPRISING A RADIALLY ENLARGED POST ON THE SUPPORT STRUCTURE, SOFT TISSUE DISPLACEMENT SYSTEM, MANUFACTURING PROCESS AND PLANNING PROCESS FOR MANUFACTURING AN IMPLANT

(71) Applicant: KARL LEIBINGER MEDIZINTECHNIK GMBH & CO. KG, Mühlheim (DE)

(72) Inventors: Nils-Claudius Gellrich, Mühlheim (DE); Björn Rahlf, Mühlheim (DE); Frank Reinauer, Mühlheim (DE)

(73) Assignee: KARL LEIBINGER MEDIZINTECHNIK GMBH & CO. KG, Mühlheim (DE)

( * ) Notice: Subject to any disclaimer, the term of this patent is extended or adjusted under 35 U.S.C. 154(b) by 943 days.

(21) Appl. No.: 16/966,404

(22) PCT Filed: Feb. 6, 2019

(86) PCT No.: PCT/EP2019/052936
§ 371 (c)(1),
(2) Date: Jul. 30, 2020

(87) PCT Pub. No.: WO2019/154873
PCT Pub. Date: Aug. 15, 2019

(65) Prior Publication Data
US 2022/0192795 A1    Jun. 23, 2022

(30) Foreign Application Priority Data
Feb. 6, 2018   (DE) ..................... 10 2018 102 568.8

(51) Int. Cl.
*A61C 8/00*    (2006.01)

(52) U.S. Cl.
CPC .......... *A61C 8/0031* (2013.01); *A61C 8/0095* (2013.01)

(58) Field of Classification Search
CPC ........................... A61C 8/0031; A61C 8/0095
See application file for complete search history.

(56) References Cited

U.S. PATENT DOCUMENTS 3,082,525 A * 3/1963 Christensen ......... A61C 8/0075
                                                            433/173
4,121,340 A * 10/1978 Patrick ................. A61C 8/0019
                                                            433/176
(Continued)

FOREIGN PATENT DOCUMENTS

| CA | 2915531 | 1/2015 |
|---|---|---|
| CA | 3 009 091 | 6/2017 |

(Continued)

OTHER PUBLICATIONS

International Search Report and Written Opinion dated Jul. 30, 2019 from International Application No. PCT/EP2019/052936.
(Continued)

*Primary Examiner* — Nicholas D Lucchesi
(74) *Attorney, Agent, or Firm* — Beyer Law Group LLP

(57) ABSTRACT

The invention relates to an implant (1) comprising a support structure (5) which is prepared for anchoring, following the contours of the bone, in a jaw- and/or cranial bone (2), wherein at least one integrally attached post (7) protrudes from the support structure (5), said post being designed to have a finished denture anchored thereto and the post (7) having a base (9) that is formed out of the support structure (5) and is completed by a distal end region (10) with the interposition of a radially enlarged region (11). The invention also relates to a soft tissue displacement system (19) comprising an implant (1), a manufacturing process for a
(Continued)

Figure 1:
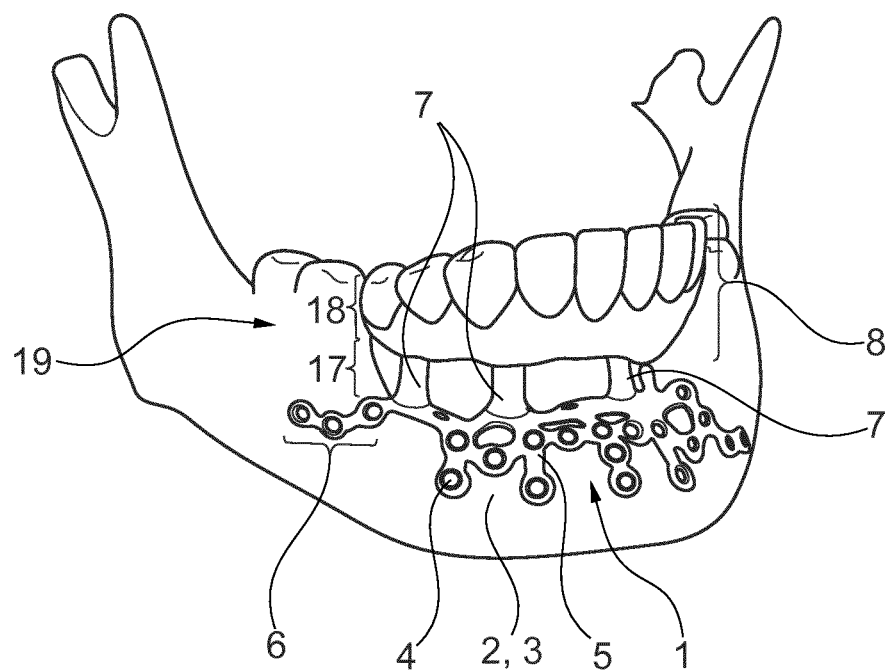

soft tissue displacement system (19) and a planning process for manufacturing an implant (1).

16 Claims, 7 Drawing Sheets

(56) References Cited

U.S. PATENT DOCUMENTS

| | | | | |
|---|---|---|---|---|
| 4,179,809 | A * | 12/1979 | Fagan, Jr. | A61C 8/0089 |
| | | | | 433/176 |
| 5,052,930 | A * | 10/1991 | Lodde | A61C 8/0031 |
| | | | | 433/176 |
| 5,141,435 | A * | 8/1992 | Lillard | A61C 8/0033 |
| | | | | 433/176 |
| 5,433,607 | A | 7/1995 | Schmid et al. | |
| 5,967,783 | A | 10/1999 | Ura | |
| 2005/0209595 | A1 | 9/2005 | Karmon | |
| 2005/0272007 | A1 | 12/2005 | Ihde | |
| 2009/0317765 | A1 * | 12/2009 | Dacremont | A61C 8/0031 |
| | | | | 433/174 |
| 2010/0035207 | A1 | 2/2010 | Chen | |
| 2013/0084542 | A1 | 4/2013 | Baptiste | |
| 2014/0080092 | A1 | 3/2014 | Suttin et al. | |
| 2014/0178839 | A1 | 6/2014 | Berger | |
| 2014/0243982 | A1 | 8/2014 | Miller | |
| 2016/0120582 | A1 | 5/2016 | Martinez | |
| 2017/0020634 | A1 | 1/2017 | Sonnleitner | |
| 2017/0202649 | A1 | 7/2017 | Bernhard et al. | |
| 2018/0000568 | A1 | 1/2018 | Berger | |
| 2018/0104028 | A1 * | 4/2018 | Robichaud | A61C 8/0031 |
| 2018/0161129 | A1 * | 6/2018 | Mommaerts | A61C 8/0031 |
| 2018/0325630 | A1 | 11/2018 | Leger et al. | |
| 2020/0261189 | A1 | 8/2020 | Waizenegger et al. | |
| 2021/0052355 | A1 * | 2/2021 | Poitras | A61C 8/0027 |
| 2022/0015871 | A1 * | 1/2022 | Atkinson | A61C 8/0069 |

FOREIGN PATENT DOCUMENTS

| | | |
|---|---|---|
| CN | 105025846 | 11/2015 |
| CN | 105338922 | 2/2016 |
| CN | 105982746 | 10/2016 |
| CN | 106232054 | 12/2016 |
| CN | 106659550 | 5/2017 |
| CN | 106725946 | 5/2017 |
| CN | 107374762 | 11/2017 |
| CN | 107530148 | 1/2018 |
| DE | 10305887 | 8/2004 |
| DE | 10 2015 122 800 | 5/2017 |
| GB | 2010095 | 6/1979 |
| IT | 1108531 | 12/1978 |
| JP | 2014-521468 | 8/2014 |
| JP | 2016-523160 | 8/2016 |
| WO | WO 00/06044 | 2/2000 |
| WO | WO 2011/078475 | 6/2011 |
| WO | WO 2015/001137 | 1/2015 |
| WO | WO 2016/198935 | 12/2016 |
| WO | WO 2017/021010 | 2/2017 |
| WO | WO 2017/072066 | 5/2017 |
| WO | 2017/108357 | 6/2017 |
| WO | WO 2017/174403 | 10/2017 |
| WO | WO 2019/081059 | 5/2019 |

OTHER PUBLICATIONS

German Search Report dated from German Application No. 10 2018 102 568.8.
Chinese Office Action dated Jul. 28, 2021 from Chinese Application No. 201980011602.8.
Chinese Office Action dated Mar. 10, 2022 from Chinese Application No. 201980011602.8.
Machine translation of the German Search Report, from German Application No. 10 2018 102 568.8.
Japanese Office Action dated Feb. 16, 2023 from Japanese Application No. 2020-542548.
European Office Action dated May 19, 2022 from European Registration No. 19705299.6-1122.
Notice of Allowance dated Jan. 9, 2024 from Japanese Application No. 2020- 542548.

* cited by examiner

IMPLANT COMPRISING A RADIALLY ENLARGED POST ON THE SUPPORT STRUCTURE, SOFT TISSUE DISPLACEMENT SYSTEM, MANUFACTURING PROCESS AND PLANNING PROCESS FOR MANUFACTURING AN IMPLANT

The invention relates to an implant with a support structure which is prepared for anchoring, following the contours of the bone/adapted anchoring at a jaw and/or cranial bone, wherein at least one post/foundation/peg, which is attached integrally/in one part/in one material/in one piece, preferably transitioning into the support structure over a radius, protrudes from the support structure and is configured for anchoring a final denture thereto.

From the prior art, such as DE 10 2015 122 803 B3, an implant adapted in form to the bone structure having a foundation and an associated manufacturing method is known. This earlier invention relates to an implant for attachment to a bone with a support structure having at least one fixation portion following a bone structure for attachment to the bone, wherein a foundation for receiving a prosthesis directly or by using an intermediate part/abutment protrudes from the support structure. Furthermore, this older invention also relates to a method for manufacturing an implant, comprising the step of acquiring individual patient data, creating the support structure and/or the foundation on the basis of the individual patient data. The special aspect of this earlier implant is that a foundation for receiving a prosthesis protrudes from the support structure directly or by using an intermediate part, wherein the foundation is an integral/one-piece component of the support structure. It is remarkable with regard to the method that the support structure is manufactured on the basis of the individual patient data, which was collected by means of CAD/CAM techniques.

Up to now, these implants have also been used and attached to the bone, i.e. implanted. The previous support structures were then usually covered with soft tissue during the operation. The gingiva, i.e. a part of the oral mucosa, was usually used for this.

Covering the support structure was usually realized by at least the posts, which can also be described as foundation, protruding through the gingiva, i.e. through the soft tissue. During the healing process, however, it was found that the soft tissue, i.e. usually the gingiva, grew over the posts/foundation. As a result, each individual post/foundation had to be surgically exposed before the insertion of the permanent/final denture. This is cumbersome and undesirable from the patient's perspective.

It is therefore the object of the present invention to provide a better implant and present a system that can be used as a soft tissue displacement system until the final prosthesis is placed. The costs for such an implant or soft tissue displacement system are to be kept as low as possible, but the adaptation to the specific patient is to be as high as possible. It should also be possible to manufacture a particularly handy/clever compromise in a particularly efficient, precise and fast way. Therefore, it is also the object of the invention to provide an improved manufacturing method and planning method. Furthermore, it is the object of the present invention to eliminate or at least reduce the disadvantages of the prior art.

This object is solved in a generic implant according to the invention by the post/foundation/peg having a base formed by the support structure and preferably made of support structure material, which is completed by a distal end region with the interposition of a radially enlarged region. Preferably, the post has an outer diameter which is largest in the region of the radially enlarged region and is smaller in the region of the distal end region and/or the base than in the region of the radially enlarged region. It is particularly preferred if the outer diameter tapers in the region of the distal end region towards its distal end, in particular continuously.

In this way, on the one hand the placement of a holding-down device and on the other hand the placement of a final denture can be carried out with such precision that the final position of the holding-down device and final denture is exactly predetermined relative to the support structure and at the same time within the patient. This allows for a good chewing performance of the patient and a pleasant feeling for the patient. The radially enlarged regions present at each post also ensure that the distal end regions remain free when the support structure is covered with soft tissue up to the radially enlarged regions. During healing it is also ensured that normally the distal end regions remain uncovered by soft tissue. This allows faster and less complicated treatment of the patient.

According to the invention, the distal end region has a rotation-prevention flat portion. Alternatively, the end region can also have a projection that serves as a rotation prevention. In accordance with an advantageous further development, the final denture and/or the holding-down device can be adapted to the shape of the rotation-prevention flat portion, i.e., for example, it can have a projection corresponding to the shape of the flat portion. By forming the post (and the final denture or respectively the holding-down device) in a form deviating from rotational symmetry, a relative rotation between the holding-down device or respectively the denture and the support structure can be safely excluded, even if only one post is formed on the support structure. Thus, rotation of the holding-down device relative to the support structure and of the final denture relative to the support structure can be excluded permanently with simple means.

Advantageous configurations are claimed in the dependent claims and are explained in more detail below.

According to an advantageous development, several posts can protrude from the support structure, wherein the rotation-prevention flat portions of the several posts are arranged parallel to each other. This means that the planes, in which a respective rotation-prevention flat portion is arranged, are oriented parallel to each other.

It is advantageous if the distal end region is prepared/dimensioned and provided for anchoring a holding-down device of soft tissue and/or for anchoring a final denture. In this way, the same posts/foundations can be used to precisely position the holding-down device on the one hand and to precisely and finally hold the final denture on the other hand.

If the distal end region has a retention shape, e.g. conical or pyramidal in the direction of its end, the position of the individual parts relative to each other can be determined more precisely. In addition, this allows the final denture and/or the holding-down device to be pushed on. According to a preferred configuration, the retention form is elastically deformable, so that non-destructive removal of the holding-down device and/or of the final denture is possible.

It has proven to be effective if the radially enlarged region is designed as a collar surrounding the post/foundation. It is particularly preferred if the collar has a substantially semi-circular cross-section. On the one hand, this simplifies production and, on the other hand, improves operational use.

This allows the soft tissue to be placed more precisely on the support structure. A particularly anatomical treatment of the patient can be achieved if the collar is positioned in a common plane, through which the center axis/symmetry axis of the post/base preferably runs vertically.

In a preferred configuration, several posts can protrude from the support structure, wherein the radially enlarged regions of the several posts are arranged in a common plane. This ensures that an essentially plate-shaped holding-down device, which is inexpensive and easy to manufacture, can be accommodated.

An advantageous embodiment is also characterized by the fact that the post/foundation has a tulip shape, e.g. above or below the collar, or when viewed over the entire length of the post. This allows better retention of the soft tissue.

If the entire post/foundation or a partial region of it is modified and/or has a different surface structure as compared to the region of the support structure surrounding the post/foundation, then the implant can be designed to withstand a particularly high load.

It has proven successful in practice if modified or surface-changing regions of the post/foundation are polished and/or coated and/or etched, and in particular have a surface roughness of Rz 0.04 µm to Rz 25 µm, preferably Rz 1.15 µm.

In this context, it is also advantageous if the modified region of the post or the entire post, and possibly even the entire implant, has an antibacterial coating, in particular in the area of a planned penetration point through the soft tissue, such as the gingiva. The healing process is then particularly uncomplicated.

If there is a thread in the post for receiving an anchoring screw, the central axis of which is set upright/arranged in a concentric manner with the center axis/symmetry axis of the post/foundation, on the one hand the holding-down device can be very easily and permanently fixed to the post and on the other hand it can be removed again to be detached from a final denture. Its anchoring is then also not only detachable (in a complex manner) but also simple. Of course, instead of a detachable connection, a permanent connection can also be used.

Furthermore, it has proven to be effective if receiving holes are provided in the support structure for such fixation screws, by means of which the implant can be fixed to the patient's bone, wherein at least one of the receiving holes provides a locking mechanism/latching mechanism.

It is advantageous if the locking mechanism is provided for locking the fixation screw to the support structure. This makes surgical insertion of the implant significantly easier.

An advantageous embodiment is also characterized in that the locking mechanism is realized in that at least one of the receiving holes has a threaded portion which, when the fixation screw projecting through this receiving hole is (approximately) completely screwed into the bone, is filled by an outer thread portion of said fixation screw, thus forcing a form fit there between.

It has also proven to be effective if one or more bridge parts protrude from the support structure, which are designed to be attached away/remotely from a fixing point, roughly outside/away from the jaw and/or away from alveolar projections. The treatment of larger tumors is then also easier.

Adjusting the implant to the specific patient and the expected individual loading situation is simplified if the support structure has different thickness portions in its post-free areas.

For example, it has proven to be effective if some of the different thickness portions are specifically configured so that they act as bracing and/or reinforcements and/or spring areas.

Healing of the implant and healing of the soft tissue is usually particularly uncomplicated if the receiving holes are adapted to the fixation screw to be inserted there in such a way that the fixation screw, when (fully) inserted in the bone, is flat/flush with the surface of the surrounding support structure.

It has also proven to be correct to manufacture the entire support structure including or excluding the posts or only the posts/one of the posts from metal and/or ceramic and/or polymer (e.g. PEEK). The material in question can be used exclusively or in combination with other materials.

A further advantageous embodiment is also characterized by the fact that the support structure is designed in such a way that the regions remote from the post are increasingly flexible/bendable, e.g. depending on the distance from the post.

The invention also relates to a soft tissue displacement system, with an implant, preferably formed according to the invention, which has a support structure prepared for anchoring, following the contours of the bone, at a jaw and/or cranial bone (section), wherein at least one post/foundation attached integrally/in one part/in one material/in one piece protrudes from the support structure, which is configured for anchoring a final denture thereto/thereon. In this case, an anchoring screw hole for receiving a fixing anchoring screw is conveniently provided in the center of the post.

The object of the invention in such a genus-determining soft tissue displacement system according to the invention is solved in that a holding-down device different from the final denture is anchored at/on the post. In this way, by using a universal implant, a holding-down device that displaces soft tissue can be used on the one hand and the exact attachment of a final denture is possible on the other hand.

Such a soft tissue displacement system can also be further developed, as is the subject matter of the dependent claims and is explained in more detail below.

It is advantageous if the holding-down device is optically and functionally adapted to adjacent teeth and adjacent soft tissue, such as the oral mucosa/gingiva. In this way, a good fit of the individual parts can be achieved.

In this context, it has also proven to be effective if the holding-down device is configured and dimensioned to prevent the post/foundation from becoming overgrown. An additional operation to uncover the post/foundation is then not necessary.

In order to keep costs low, it has proven to be effective if the holding-down device is made/consists of plastic or has plastic parts.

The application becomes particularly versatile if the post/foundation and the holding-down device are adapted for anchoring to each other for being fixed/permanently fixed or conditionally removable, i.e. tool-dependent/tool-required removal or tool-free removal. This versatility of attachment then enables use with a wide variety of patients and different initial treatment conditions. Installation of the individual parts is particularly unproblematic if the underside of the holding-down device facing the post has at least one indentation configured to receive a distal end region of the post/foundation. The post can then be easily inserted into the holding-down device and a fixation can be achieved, for example, by using an adhesive mass.

In this context, it has also proven to be effective if the indentation is designed in the manner of a blind hole, or alternatively in the manner of a through hole, or in the manner of a trough. While the blind hole is beneficial to precision, the trough can rather be used to compensate for play. A trough use also lays the foundation for the use of a (single/predetermined) holding-down device for different individually manufactured implants on their support structures, i.e. posts.

In order to match the holding-down device particularly well to the implant, it has proven to be effective if the indentation is surrounded/formed by side walls which, when the holding-down device is placed on the post/foundation, are dimensioned/configured for (direct) contact of the distal end region of the post/foundation or the interposition of an intermediate medium.

It has proven to be efficient in terms of treatment if the intermediate medium comprises an adhesive compound and/or an anchoring sleeve/intermediate piece.

It is advantageous for the anchoring sleeve if it has at least one radially protruding anchoring pin or has several radially protruding anchoring pins, preferably two anchoring pins pointing away from each other on opposite sides of the anchoring sleeve. This allows for creating particularly good engaging from behind, which is advantageous for the support.

It is advantageous if the anchoring pin or anchoring pins is/are present at an end of the anchoring sleeve near the holding-down device.

It is advantageous for the precision of the anchoring if the indentation is configured to accommodate a single post/foundation, wherein it is advantageous if the indentation is configured to accommodate several posts/foundations, since this results in greater universal applicability.

In order to achieve a quick treatment of the patient, it has proven to be effective if the adhesive mass is in the form of cement or an adhesive.

For an optically appealing result, it is advantageous if the holding-down device has a gingiva reconstruction region close to the implant, which is completed by a tooth reconstruction region remote from the implant.

To prevent rotation of the holding-down device relative to the implant, it is advantageous if there are several spaced indentations of the holding-down devices.

An advantageous embodiment is also characterized in that the holding-down device is fixed to the implant by means of anchoring screws, wherein at least one of the anchoring screws is fixed in the post/foundation and protrudes through the holding-down device. Of course, the anchoring screw can not only engage the post/foundation, but also other parts of the support structure.

An advantageous embodiment is also characterized in that the anchoring screw is centered/central/centric/concentric to the post/foundation and/or oriented parallel/inclined/transverse/concentric to a central axis/center axis through the post/foundation.

If the anchoring screw is countersunk in a through hole of the holding-down device at a distance from the surface of the tooth reconstruction region remote from the implant, anchoring is possible without any problems.

During use by the patient, it has proven to be effective if one screw head of the anchoring screw is covered by a cover element that is inserted flush with the surface of the tooth reconstruction region remote from the implant.

It is furthermore advantageous if the plurality of indentations and the plurality of posts are coordinated with each other in such a way that it is possible/predetermined that the holding-down device can be placed/pushed on in a single predetermined direction; preferably from above, for instance on the one hand when a) fixing the implant to the lower jaw, or from below, for instance when b) fixing the implant to the upper jaw, and/or on the other hand when fixing the implant to a section of the cranial bone.

The invention also relates to a manufacturing method of a soft tissue displacement system, in particular of the type according to the invention, wherein in a preparatory step, information on the individual dental arch shape acquired by standard measuring devices, for example by standard impression trays of the sizes '0' to '4' which are internationally used in dentistry, is used to select a specific one from a set of prefabricated standard holding-down devices, wherein subsequently, depending on patient-specific conditions, an adjustment of the overall extension is made. The information about the standard impression tray provides sufficient information about the limitation of the curvature of the curve connecting—per jaw—the row of teeth or the cutting edges (in the anterior tooth region) and longitudinal fissures (in the side tooth region). The charming thing is then that a model-free, digital shortening to the area 'of interest' (i.e., to the area to be replaced) in order to create 'only' the soft tissue displacement element. Alternatively, an additional template/key made of plastic and/or metal can also be created using the remaining residual tooth structure and the virtually supplemented tooth structure or alternatively the one-piece implant with framework structure and attached posts, in order to check the orientation of the existing tooth structures to the new one-piece implant with posts (and/or supplemented with the soft tissue displacement element), i.e. for quality assurance. Furthermore, the combination of such an additional template could also be used to orient e.g. conventional implants exactly in vector drilling and position in addition to the one-piece implant with framework structure.

In this context, it is also advantageous if one or more indentations are arranged in the holding-down device in order to make coupling with (respectively) one or more posts of an implant manufactured specifically for the patient possible.

The invention ultimately also relates to a planning method for manufacturing an implant with a holding-down device for, for example, a soft tissue displacement system according to the invention or with an individual denture, wherein an individual support structure/framework structure of the implant is planned and the implant is provided with standard dental crown portions for forming a holding-down device for soft tissue, wherein those posts intended to receive the holding-down device are designed to receive an individual denture after removal of the holding-down device.

The background to the invention is that at present, individualization is generally desired in medicine, but functionalization is not yet sufficiently understood. The invention also makes a later activation, the use of measurements and the application of coating processes possible. It is also planned to provide a reservoir function for certain bioactive substances.

Either the soft tissue displacement element itself or the later denture can contain an internal volume reservoir in order to then release any substances—preferably liquids. This aspect could be implemented by the use of micro motors/pumps. In particular, vasoactive substances can be introduced in this way. An energy or substance storage function can also be implemented. The achievement of connector systems, such as storing chewing energy as electrical energy, is conceivable. Finally, functionalization and individualization based on standard elements is possible. The use of a temporary denture with the special task of a soft tissue displacement system becomes more patient-friendly. The holding-down device acts as a bar, which is attached/applied to the posts of the support structure, which is designed as an intermediate structure. Applying it can be designed to achieve a tight fit or 'conditional' removability or 'complete' removability.

In the manufacturing method, the use of imaging-based measures, such as CT scans, is also conceivable, wherein on the other hand, simple observations, e.g. of an optical nature, can be employed to determine the extent of the defect. In the end, the production of a holding-down device adapted to the individual from one of five standard holding-down device blanks is suggested. Such standard hold-down device blanks will then have receiving holes or receiving troughs for receiving the post of the implant, if necessary. Impression copings/anchoring sleeves with radially protruding retention lugs for a form fit can also be used. This means that less filling material, such as cement or adhesive, has to be used. However, better adaptation to the surface of the post is achieved at the same time.

The invention enables the targeted shaping of soft tissue. Instead of adhesives or adhesive fillings for fixing to the post, screws can of course be used as well as clamps and spring mechanisms. At best, such posts all have a parallel orientation in order to provide a specific insertion direction.

Anchoring far away from problem areas and a more precise position in space is also achieved or made possible by the invention.

The planning procedure thus enables a digital connection of the individual framework structure/of the individual implant with dental crown parts made of standard elements for the individual and/or with individual dentures.

In other words, the core of the invention provides that the points of passage of the post are to be designed/modified differently with respect to their surface characteristics than the rest of the implant. Polishing, coating and etching are suitable for this purpose. Furthermore, a locking mechanism is realized. For example, a threaded portion is present in a through hole of the implant, which (also) forms a form fit when the screw is completely screwed into the bone. A stationary fixation outside of the jaw and/or remote from the alveolar processes is possible. The use of different plate thicknesses is planned. These plate thicknesses are to be adapted to the height of the connecting screw head or in such a way that they are more flexible the further they are from the post. The result is a good fulfilment of the respective biomechanical requirements. The screw heads and the surrounding plate material form a flat surface at best. It is conceivable, for example, to produce only the posts from ceramic and the rest of the support structure from metal, or to use a polymer such as PEEK for certain parts. Furthermore, an antibacterial coating of the point of passage or the whole post or the whole implant is conceivable. A tulip shape of the posts allows a better retention of the soft tissue. A thread which is accessible from above for the retention screw may also be present in the post.

The invention is explained in more detail below with the aid of a drawing. Different embodiments are shown.

Figure 2:
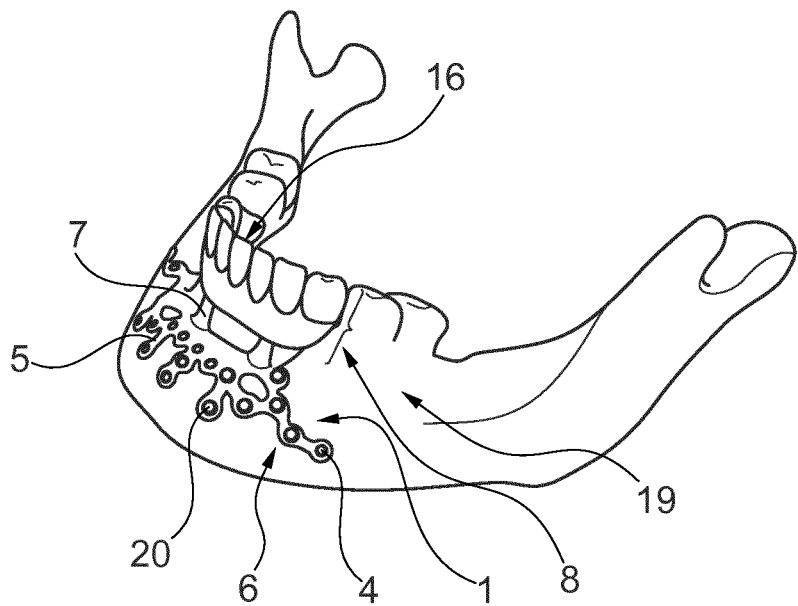
Figure 3:
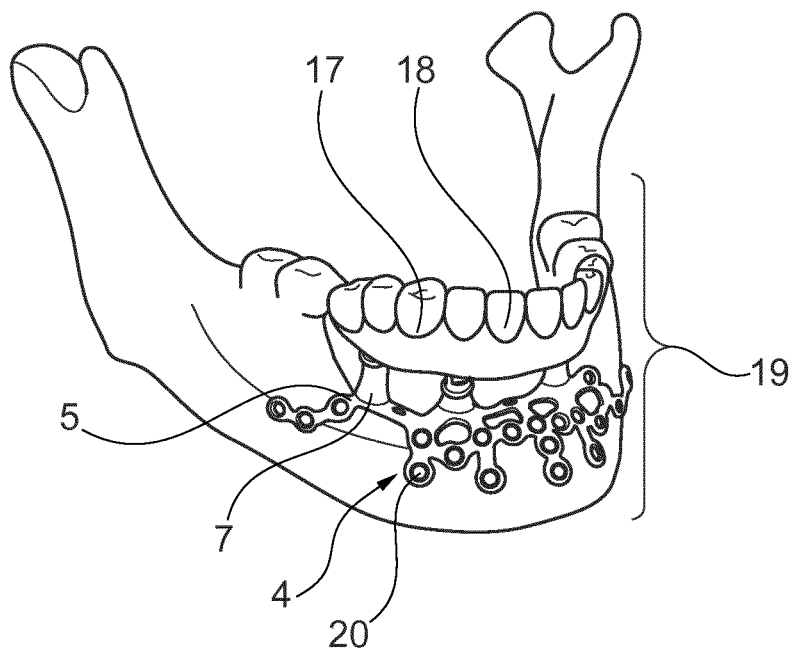
Figure 4:
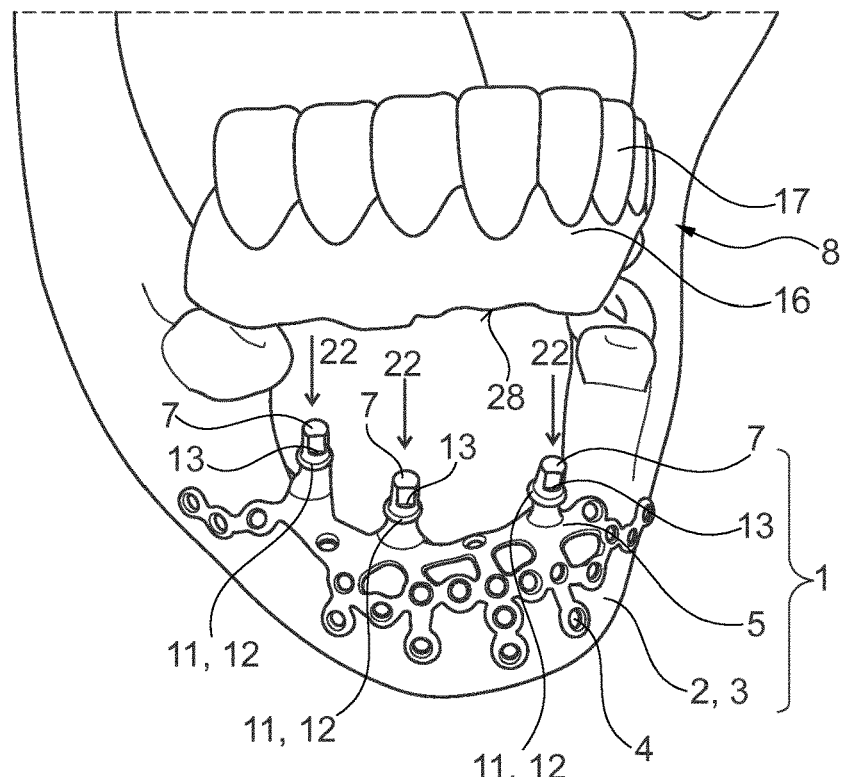
Figure 5:
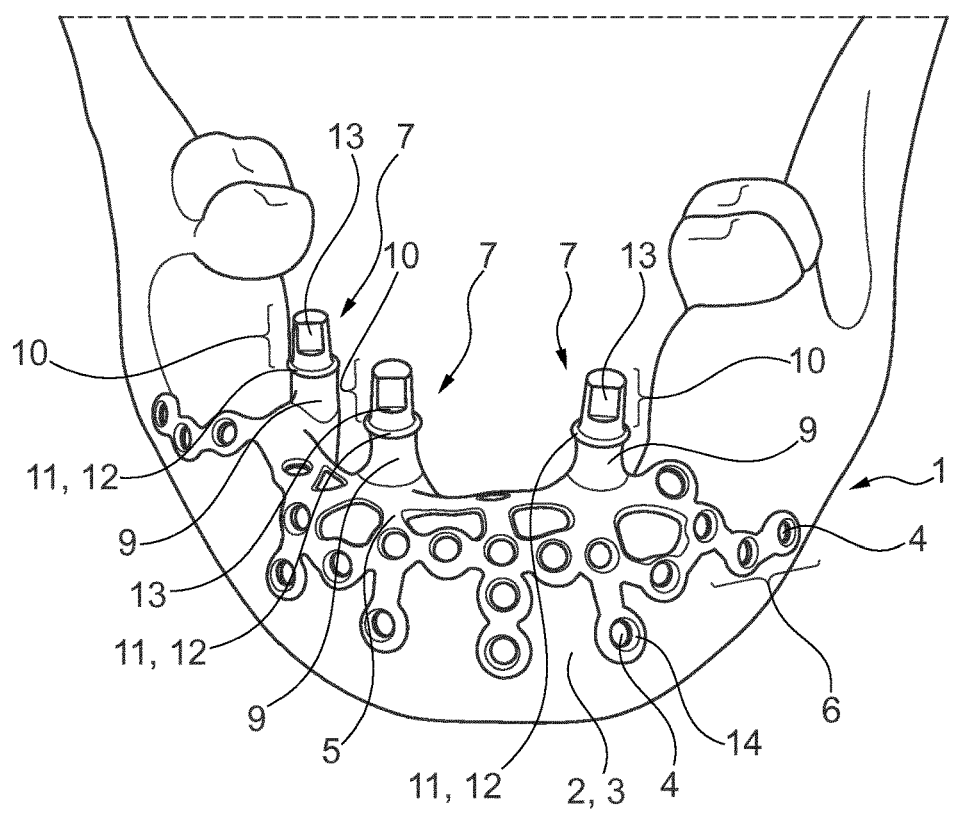
Figure 6:
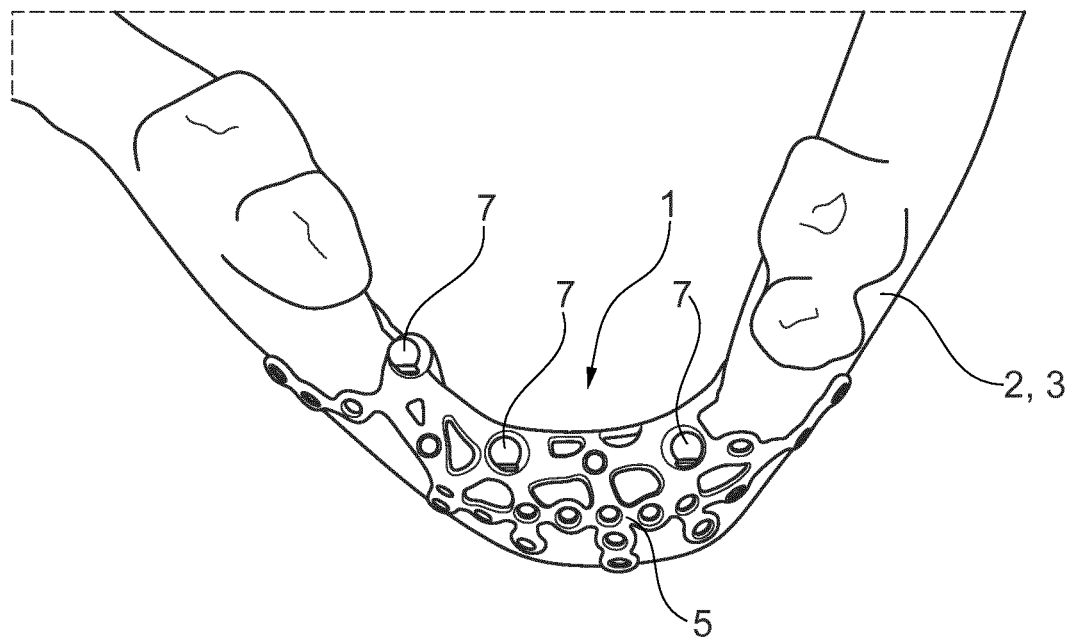
Figure 7:
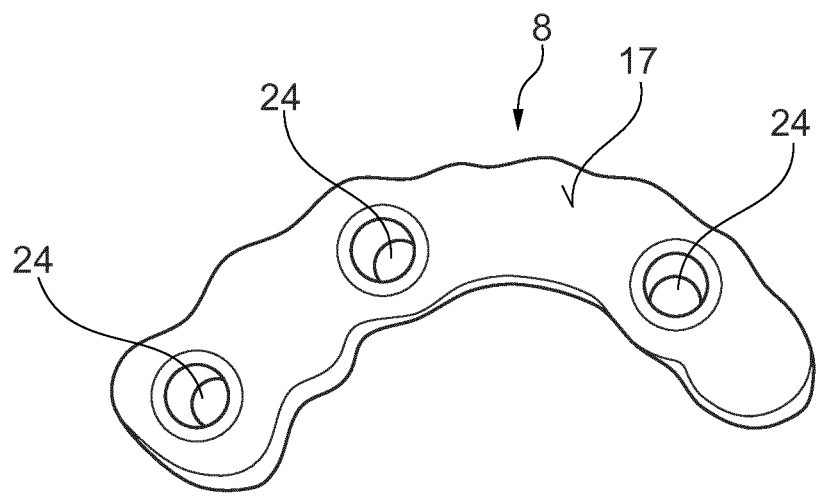
Figure 8:
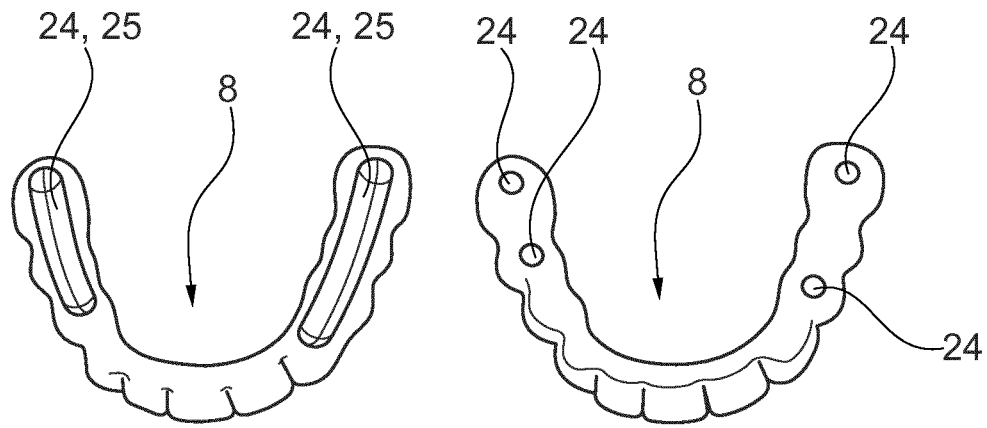
Figure 9:
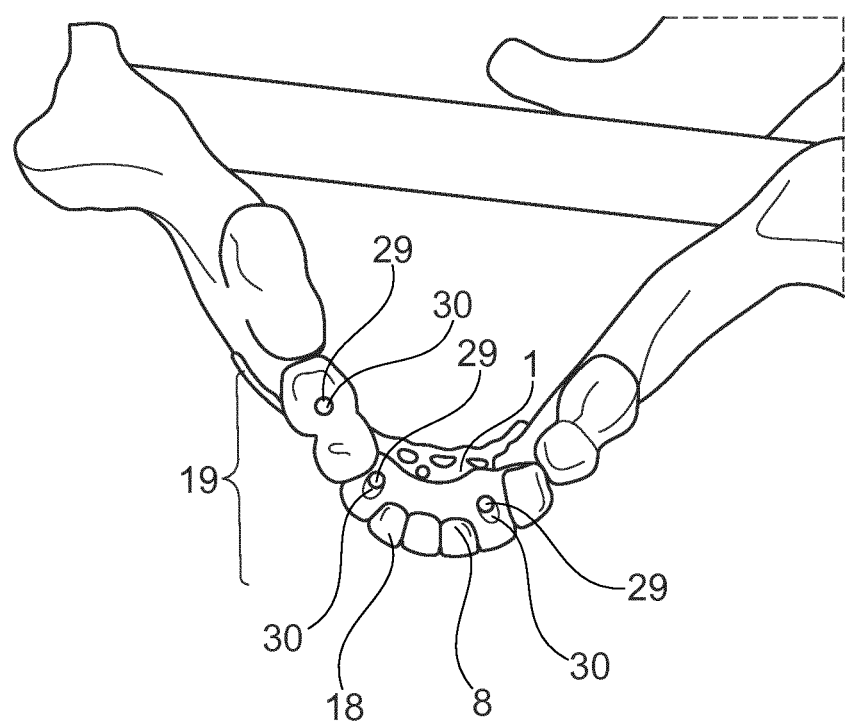
Figure 10:
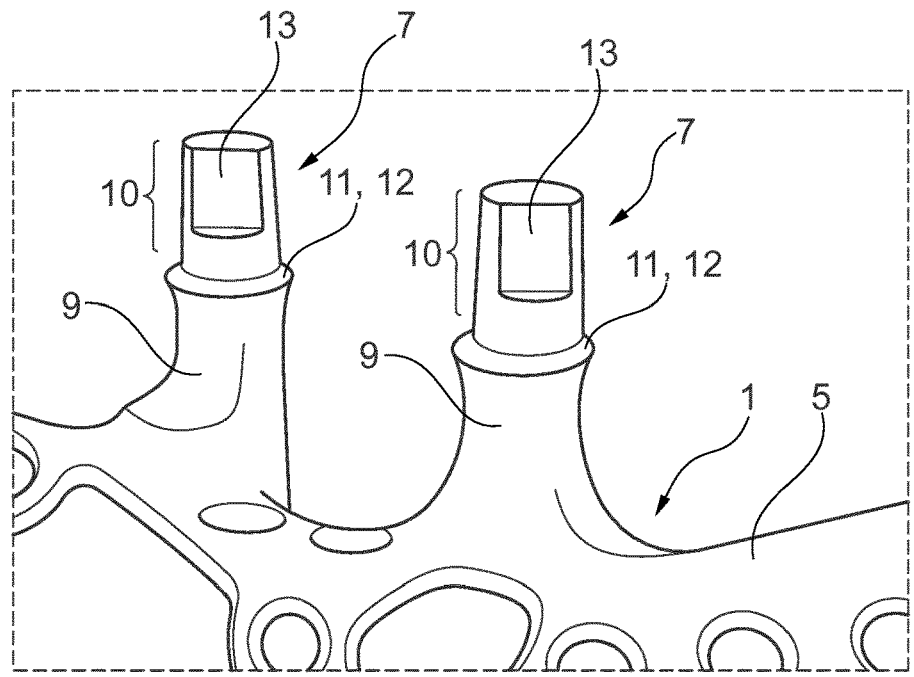
Figure 11:
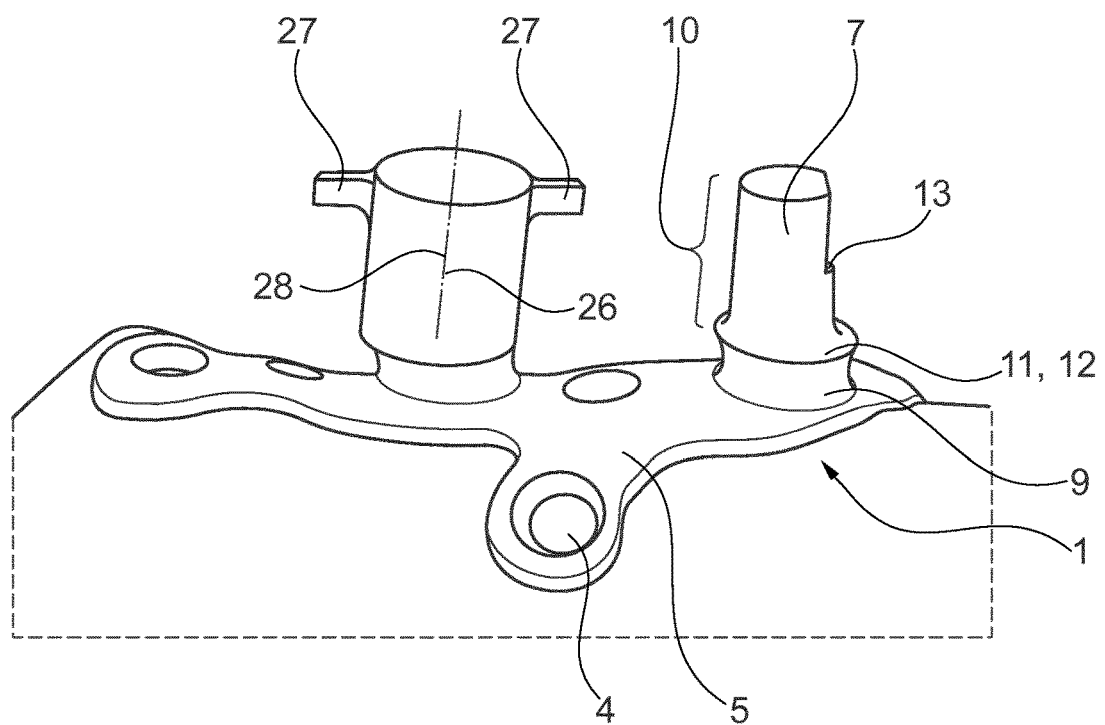
Figure 12:
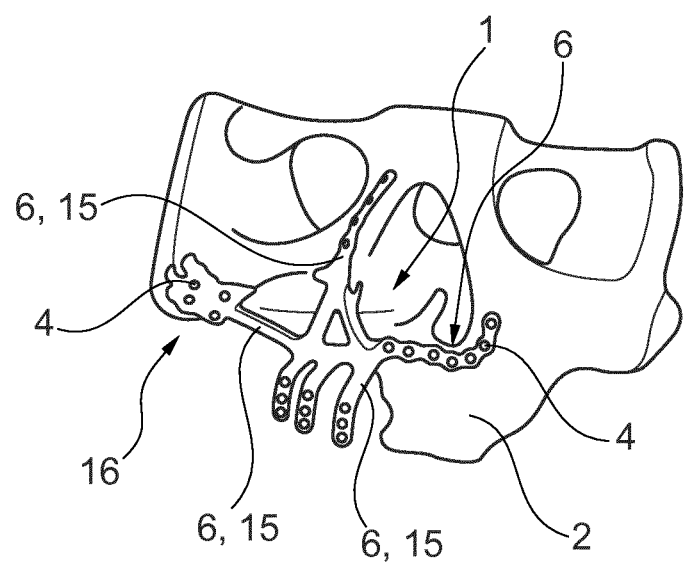

The Figures show:

FIG. 1 shows a frontal view of an implant according to the invention with a holding-down device according to the invention connected to it to represent a soft tissue displacement system according to the invention, FIG. 2 shows a second configuration of such a soft tissue displacement system, FIG. 3 shows a further perspective view of the embodiment from FIG. 2, FIG. 4 shows the implant from FIG. 1 with the holding-down device removed, FIG. 5 shows the single implant from FIG. 4 in contact with a mandible bone, FIG. 6 shows a further representation of the implant from FIG. 5 when viewed from above, FIG. 7 shows a single representation of the holding-down device, from one side of the implant, as seen in the embodiments of FIGS. 1 and 4, FIG. 8 shows two variants of an alternative holding-down device for the configuration of the holding-down device from FIG. 7, FIG. 9 shows a view of the alternative holding-down device placed on the support structure of an alternative implant, FIG. 10 shows an enlargement of the posts at the support structure of an implant, FIG. 11 shows an anchoring sleeve inserted between the holding down device and the support structure, and FIG. 12 shows a further configuration of an implant according to the invention with bridge parts protruding particularly far from a treatment site.

The figures are merely schematic in nature and only serve to understand the invention. The same elements are provided with the same reference signs. Features of the individual embodiments are interchangeable.

FIG. 1 shows an implant 1 according to the invention. The implant 1 is to be anchored to a jaw bone 2, i.e. a mandible bone. No fixation screws 20 (see FIG. 2) have been inserted in the condition shown. However, the fixation screws 20 are provided for penetrating receiving holes 4. These receiving holes 4 can be present in a grid-like structure, i.e. a support structure 5. In particular, they can be present in fixation portions 6.

In the embodiment shown in FIG. 1, the support structure 5 has three posts 7, which can also be described as foundation. A holding-down device 8 is attached onto the posts 7. This holding-down device 8 is fitted precisely onto the posts 7.

As can be seen well in FIG. 5, each post 7 has a base 9. At a distal end of each post 7, there is a distal end region 10. Between the distal end region 10 and the base 9 there is a radially enlarged region 11. The radially enlarged region 11 is shaped like a collar 12. The collar 12 is formed around the surface of the post 7, i.e. circumferentially, and lies in a special plane. This plane is the plane that is oriented perpendicular to the center axis/symmetry axis of the post 7. Finally, the post 7 has a tulip shape.

The post 7 has a flattening 13 at the front. The flattening 13 can also be called flat portion and is used to realize a rotation prevention flat portion.

In the embodiment of FIG. 5 it can also be seen that in the receiving hole 4 there is a threaded portion 14, which is provided for interaction and to be filled form-fittingly by an outer thread of the fixation screw 20 which is not shown. The fixation screw 20 penetrates into the bone, i.e. the jaw bone 2.

In anticipation of FIG. 12, it is already explained that certain fixation portions 6 can be formed as bridge parts 15. It is also possible that at a distal end of such a bridge part 15, an additional grid structure 16 may be present, e.g. in the form of a plate. That plate may in turn have receiving holes 4, as realized in the embodiment of FIG. 12.

Coming back to FIG. 1, it should be explained that the holding-down device has a gingiva reconstruction region 17, which is complemented on the side of the oral cavity by a tooth reconstruction region 18 remote from the implant.

The implant 1 and the holding-down device 8 together form a soft tissue displacement system 19.

In the embodiment of FIGS. 2 and 3, fixation screws 20 are already inserted in receiving holes 4. As can be seen in FIG. 2 and FIG. 3, the surface marked with the reference sign 21 has a different surface structure than the adjacent elements of the support structure 5.

In FIG. 4, the placement along the arrows 22 is shown. The holding-down device 8 is thus placed on the posts 7, which project integrally/in one piece/in one material from the support structure 5. The lower edge 23 of the holding down device 8, which is referenced by the reference sign 23, rests on the collar 12, wherein alternatively a spacing can be considered.

As can be seen in FIG. 7, the holding-down device 8 has indentations 24, so that the posts 7 can be inserted there.

FIG. 8 shows two different configurations of holding-down devices 8, i.e. on the left side a holding-down device 8 having two indentations 24, which are each formed as troughs 25. The holding down device 8 shown on the right side in FIG. 8 has four indentations 24 formed as blind holes.

In FIG. 11, an anchoring sleeve 26 is shown, which is to be inserted between a holding down device 8, which is not shown, and the support structure 5. The anchoring sleeve 26 has two anchoring pins 27. The two anchoring pins 27 of the anchoring sleeve 26 protrude radially in opposite directions on opposite sides of the anchoring sleeve 26 (orthogonal to a center axis 28 of the post 7).

In the embodiment shown in FIG. 9, anchoring screws 29 are inserted to fix the holding-down device 8 from the implant 1 and then generate a soft tissue displacement system 19 according to the invention. The blind holes 30, in which the respective anchoring screws 29 are sunk, can each be covered by a cover element that is not shown.

Two of the posts 7, which can be clearly seen in FIGS. 4 and 6, are shown larger in FIG. 10.

LIST OF REFERENCE SIGNS 1 implant
2 jaw bone
3 mandible bone
4 receiving hole
5 support structure
6 fixation portion
7 post
8 holding-down device
9 base
10 distal end region of the post
11 radially enlarged region
12 collar
13 flattening
14 threaded portion
15 bridge part
16 additional grid structure
17 gingiva reconstruction region
18 tooth reconstruction region
19 soft tissue displacement system
20 fixation screw
21 surface of the post
22 placement direction
23 lower edge
24 indentation
25 trough
26 anchoring sleeve
27 anchoring pin
28 center axis
29 anchoring screw
30 blind hole

The invention claimed is:

1. An implant comprising a support structure which is prepared for anchoring, following the contours of the bone, at a jaw and/or cranial bone, wherein a plurality of integrally attached posts project from the support structure, said plurality of posts being configured for anchoring a final denture thereto, wherein each post of the plurality of posts has a base formed from the support structure, which is completed by a conical or pyramidal tapered distal end region with the interposition of a radially enlarged region, wherein the distal end region has a rotation prevention flat portion, which is arranged in a plane, for preventing a relative rotation between the support structure and the final denture which can be anchored to the posts of the plurality of posts, and wherein the planes, in which a respective rotation prevention flat portion is arranged, are oriented parallel to each other.

2. The implant according to claim 1, wherein the distal end region is prepared for anchoring a soft tissue holding-down device and/or for anchoring a final denture.

3. The implant, as recited in claim 2, wherein each post of the plurality of posts is adapted to be inserted into a holding down device wherein the holding down device receives each post of the plurality of posts.

4. The implant, as recited in claim 2, further comprising an anchoring sleeve between a post of the plurality of posts and the holding down device wherein a post of the plurality of posts is inserted in the anchoring sleeve.

5. The implant according to claim 1, wherein the distal end region has a retention form.

6. The implant according to claim 1, wherein the radially enlarged region is formed as a collar surrounding each post.

7. The implant according to claim 6, wherein the collar is received in a plane through which a center axis of each post runs perpendicular.

8. The implant according to claim 1, wherein several posts protrude from the support structure, wherein the radially enlarged regions of the several posts are arranged in a common plane.

9. A soft tissue displacement system having an implant which has a support structure which is prepared for anchoring, following the contours of the bone, in a jaw and/or cranial bone, wherein a plurality of posts protrude from the support structure, said plurality of posts being configured for anchoring a final denture thereto, wherein the soft tissue displacement system has a holding-down device which can be anchored to the posts of the plurality of posts and which is essentially plate-shaped, has at least one indentation for receiving a distal end region of the posts of the plurality of posts and is anchored to the posts of the plurality of posts, wherein the distal end region of each post of the plurality of posts has a rotation prevention flat portion, which is arranged in a plane, for preventing a relative rotation between the support structure and the holding-down device anchored to the posts of the plurality of posts and wherein the several planes are oriented parallel to each other.

10. The soft tissue displacement system according to claim 9, wherein the holding-down device is optically and functionally adapted to adjacent teeth and adjacent soft tissue.

11. The soft tissue displacement system according to claim 9, wherein each post of the plurality of posts is adapted to be inserted into a holding down device wherein the holding down device receives each post of the plurality of posts.

12. The soft tissue displacement system, as recited in claim 9, further comprising an anchoring sleeve between a post of the plurality of posts and the holding down device wherein a post of the plurality of posts is inserted in the anchoring sleeve.

13. A method of manufacturing a soft tissue displacement system according to claim 9, wherein, in a preparatory step, information on an individual dental arch shape acquired by standard measuring devices is used in order to select a specific one from a set of prefabricated standard holding-down devices, wherein an adjustment of an overall extension is subsequently made depending on patient-specific conditions.

14. A method of preparing for the manufacture of an implant that includes a support structure and a plurality of integrally attached posts which project from the support structure, each post of the plurality of posts being configured for anchoring a final denture thereto and the support structure being configured to follow contours of a jaw bone and/or cranial bone, wherein each post has a base formed from the support structure, which is completed by a distal end region with the interposition of a radially enlarged region, and wherein the distal end region has a rotation prevention flat portion, which is arranged in a plane, for preventing a relative rotation between the support structure and the final denture which can be anchored to the post, the method comprising designing each post to receive the final denture after removal of a soft tissue hold down device that is essentially plate-shaped, has at least one indentation for receiving the distal end region of each post and is anchored to each post.

15. The method, as recited in claim 14, wherein each post of the plurality of posts is adapted to be inserted into a holding down device wherein the holding down device receives each post of the plurality of posts.

16. The method, as recited in claim 15, further comprising placing an anchoring sleeve over a post of the plurality of posts and placing the holding down device over the anchoring sleeve.

* * * * *